(No Model.)
W. J. McELROY.
SYSTEM OF ELECTRICAL DISTRIBUTION FOR RAILWAYS.
No. 409,752. Patented Aug. 27, 1889.
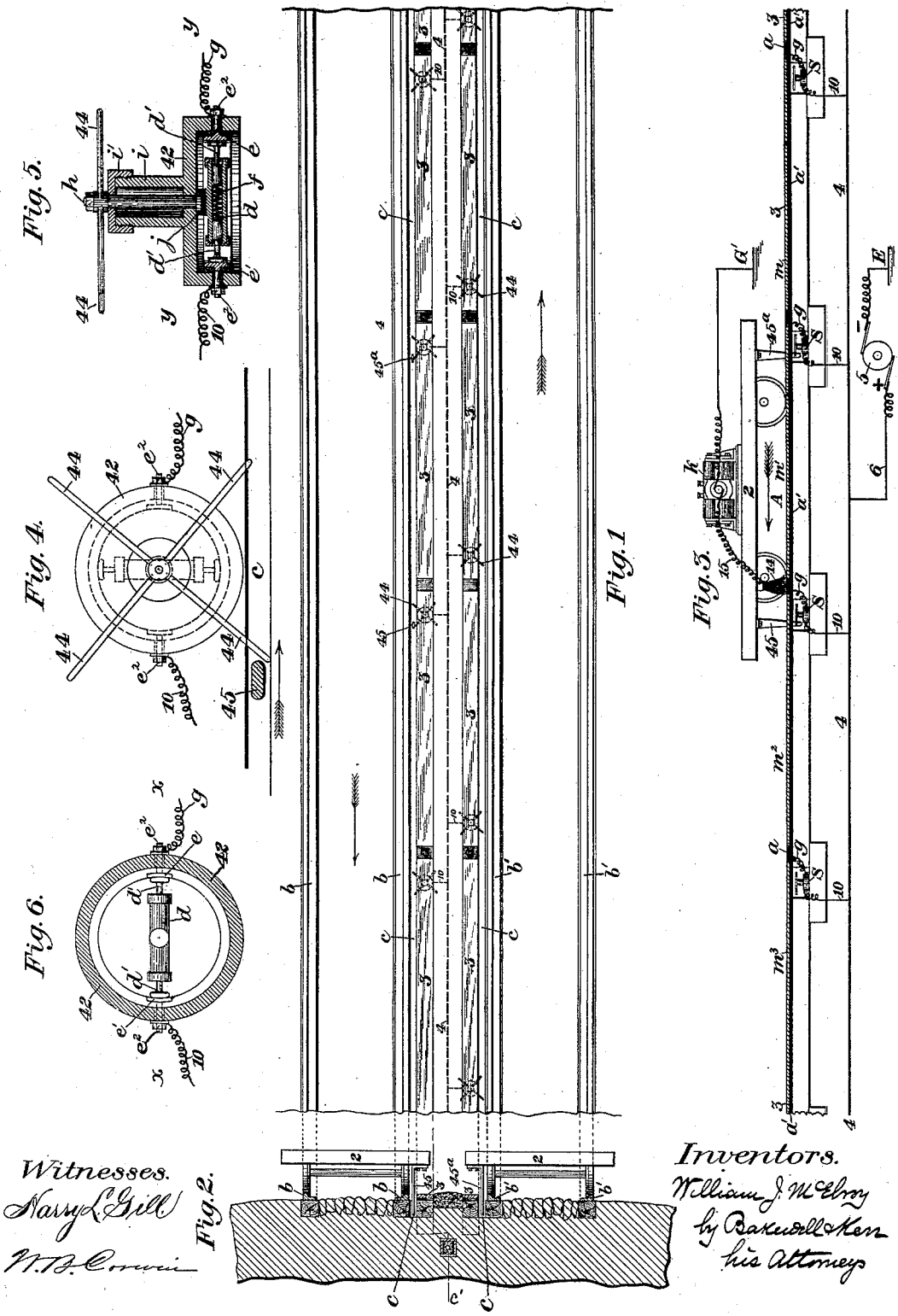
Witnesses.
Inventors.
William J. McElroy
by Bakewell & Kerr
his Attorneys

UNITED STATES PATENT OFFICE.

WILLIAM J. McELROY, OF PITTSBURG, PENNSYLVANIA.

SYSTEM OF ELECTRICAL DISTRIBUTION FOR RAILWAYS.

SPECIFICATION forming part of Letters Patent No. 409,752, dated August 27, 1889.

Application filed October 16, 1886. Serial No. 216,392. (No model.)

*To all whom it may concern:*

Be it known that I, WILLIAM J. MCELROY, of Pittsburg, in the county of Allegheny and State of Pennsylvania, have invented a new and useful Improvement in Systems of Electrical Distribution for Railways; and I do hereby declare the following to be a full, clear, and exact description thereof.

My invention has for its object to overcome the objections incident to the modes of electrical distribution for railways now commonly in use, and is a modification of the invention for which, on the 27th day of September, 1886, I, together with J. D. Nicholson, filed an application for a patent, numbered serially 214,590.

Generally speaking, it consists in a prime electrical conductor of insulated wire, preferably buried in the earth, with lateral branches at proper intervals connecting said prime conductor with insulated surface-plates or exposed terminals of convenient size and material, with means interposed in the lateral branches for mechanically making and breaking the electrical connection between the insulated conductor and the surface-plates or terminals and so arranged that the latter are charged with electricity only at such times as may be necessary to allow the passing motor-cars to receive the current, and that at all other times they shall be disconnected from the prime conductor, and therefore harmless.

My invention also consists in other details which I shall describe, and shall specifically indicate in the claims.

In the accompanying drawings, which form part of this specification, Figure 1 is a plan view of a part of a railway-track for electric motors illustrating my improved system of electrical distribution. Fig. 2 is a vertical cross-section thereof, showing the motors on the track. Fig. 3 is a longitudinal section of the track, showing the arrangement of the electrical conductors in diagram. Fig. 4 is a plan view of a switch which constitutes part of the system. Fig. 5 is a vertical diametrical section on the line $x\,x$ of Fig. 6. Fig. 6 is a horizontal cross-section on the line $y\,y$ of Fig. 5.

Like symbols of reference indicate like parts in each.

In the drawings, Fig. 2, $b\,b$ and $b'\,b'$ indicate the lines of the railway-track, and 2 are motor-cars mounted thereon. I show two of these tracks arranged side by side for cars moving in opposite directions. This involves a simple duplication of my improved system. At intervals along the track are metallic plates 3, whose surfaces are exposed and project a little above the level of the ground. These are the contact-plates or conductor-terminals of the system and are separated from each other at their ends by insulating material $a$, which is so limited in width that the contact device of the car in passing may bridge the space between the terminal-plates. They are also insulated from the ground by an underlying layer of insulation $a'$. The distance between the ends of the adjacent terminals 3 may be varied from that which I have shown, it being necessary only that the contact device of the car may be long enough to extend from one to the other, and may make contact with the terminal-plate in advance before it leaves the plate in the rear; hence the width of this space will vary directly with the length of the contact device.

4 is the line-conductor of the system, which is insulated, and is preferably buried in an underground box or case $c'$, extending parallel with the track, Fig. 2. The electrical generator 5, which is an ordinary power-driven dynamo-machine, is, for the purpose of economical electrical distribution, preferably situated at about the middle of the line, and one of its poles + is connected therewith by a conductor 6. The other pole − of the generator is grounded, as at E. Beside the contact-plates 3, and parallel therewith, there is a trough or slot $c$ in the ground, and in or by this slot, near the ends of the several contact-plates, are set switching devices S. These are shown in detail in Figs. 4, 5, and 6 and in diagram in Figs. 1 and 3. Each switch comprises a horizontal tubular arm $d$, which is centrally pivoted within a preferably cylindrical water-tight case 42. This case has on the inside metallic contact-plates $e\,e'$, which are arranged diametrically opposite to each other, and are fastened to the box by bolts $e^2$, the plates and bolts being insulated from the case by insulating material, as shown in Fig. 5.

$d'$ are short metallic bars which project from the ends of the tube $d$. They are acted upon by an interposed coiled spring $f$, which tends to project them, and they form parts of the switch-arm $d$. The contact-plate $e'$ is electrically connected with the line-conductor 4 by the branch conductor 10, which is attached to the outer end of the bolt $e^2$, and the plate $e$ is similarly connected with the end of the adjacent terminal-plate 3 by a conductor $g$. With this construction it is clear that when the switch-arm $d\ d'$ is turned so that its ends are in contact with the opposite plates $e\ e'$, as shown in Figs. 5 and 6, the adjacent terminal-plate 3 is in electrical connection with the $+$ pole of the generator, and that when the switch-arm is turned at right angles thereto, as in Fig. 4, the connection between the generator and the terminal-plate is broken. The switch is thus turned by means of the following mechanism: The pivotal pin $h$ of the switch-arm extends up from the case 42 through a tubular casing $i$, and is electrically separated from the switch-arm by an interposed layer of insulating material $j$. The casing $i$ is covered by a cap $i'$, above which the pin $h$ projects, and at the upper end of the pin are radially-projecting horizontal arms 44. These arms project into the slot $c$, so as to be in the path of bars 45 and $45^a$, which project from the motor-car into the slot, there being one bar at each end of the car. As the car passes, its bars 45 engage the radial arms 44 and turn them in the manner of a turnstile, the forward bar turning the switch-arm $d\ d'$ into line with the contact-plates $e$ and $e'$, and the bar at the rear of the car turning it at right angles thereto into the position shown in Fig. 4.

14 is the contact device on the car. I have shown it in form of a brush, though it may be otherwise made, if desired. Its width is such that in passing the joints of the contact-plates 3 it may extend from the end of one plate to the end of the other, and may be in contact with both. The brush is connected with one of the poles of the dynamo $k$ on the car by a conductor 15, and the other pole thereof is grounded, as indicated at G', preferably through one of the wheels of the car.

The operation is as follows: As shown in Figs. 1 and 3, the motor-car is passing in the direction of the arrow A, and the contact-brush 14 is in contact with the terminal-plates marked $m'$ and $m^2$. The forwardly-projecting bar 45 of the car having just passed the radial arms 44 of the switch under the end of the terminal-plate $m^2$, has turned it so as to throw the switch-arm $d\ d'$ into contact with the opposite contact-plates $e\ e'$, and to put the terminal-plate into circuit with the generator 5, as before described, while the rearwardly-projecting bar $45^a$ of the car has by the arms 44 turned the switch under the end of $m'$ at right angles to the line connecting the contact-plates, thus breaking the circuit between the terminal $m'$ and the generator. All of the other terminals of the series except $m^2$ are then out of circuit. The current now passes from the $+$ pole of the generator through the conductor 6 to the line-conductor 4, thence through the branch conductor 10 and through the switch S and wire $g$ to the contact-terminal $m^2$, whence it passes by the brush 14 and conductor 15 through the dynamo $k$ to the return-conductor (in this case the earth) at G'. When the car moves forward on the track and its contact-brush 14 engages the end of the next succeeding terminal-plate $m^3$, the projecting cam 45 will turn its switch S so as to shunt the current from the generator through this terminal-plate to the dynamo on the car, and the rearwardly-projecting arm engaging the arms 41 of the switch under the end of the terminal-plate $m^2$ will turn the switch so as to throw this plate out of circuit. This operation is repeated as the car moves forward on the track, so that at all times the only charged terminal of the system shall be the one under the motor-car, or under the motor-cars where more than one motor is used on the line. The advantages which I derive from this are that the use of the system entails no danger to life by reason of the exposure of the charged line-wire, as is now the case when exposed charged surface-conductors are used, and that because so little of the conductor is exposed the leakage of the electric current is reduced to a minimum.

The expense attending the application of the system to a railway-line is small, owing to the simple nature of the apparatus employed.

In my system, as hereinbefore described, the earth is employed as the return-conductor from the motor to the generator-dynamo; but, if desired, an ordinary metal conductor may be so used, and the principles of open circuits automatically closed through the motor by passage of the car can, when desirable, be extended to both the main conductors. Ordinarily I deem this duplication of my improvement to be unnecessary; but it may be found advisable in some cases.

I claim—

1. In a system of electrical distribution for railways, the combination of an insulated or covered main conductor having normally open-circuited branch conductors with exposed terminals or contact-plates, a slot parallel with the railway and adjacent to said plates, and mechanically-operated switches interposed for making and breaking electrical connection between the main conductor and the exposed contact-plates and accessible only through said slot, substantially as and for the purposes described.

2. In a system of electrical distribution for railways, the combination of an insulated or covered main conductor having normally open-circuited branch conductors with exposed terminals or contact-plates, a slot parallel with the railway and adjacent to said plates, and mechanically-operated switches interposed for making and breaking electrical connection between the main conductor and the exposed contact-plates, said switches being accessible only through the slot and movable by passage of the motor-car, substantially as and for the purposes described.

3. In a system of electrical distribution for railways, a main conductor having branch conductors and exposed terminals or contact-plates, in combination with underground switches for making and breaking electrical connection between the main conductor and the exposed terminals, and a motor-car having a projection extending from the car into a slot and arranged to engage said switches therein, substantially as and for the purposes described.

4. In a system of electrical distribution for railways, a main conductor having branch conductors and exposed terminals or contact-plates, in combination with mechanically-operated switches interposed for making and breaking electrical connection between the main conductor and the exposed contact-plates, in combination with a motor-car having projections one in advance of the other, the front projection being arranged to move the switch of the terminal approached by the car to close the circuit between said terminal and the main conductor, and the rear projection adapted to move the switch of the terminal in the rear thereof to open the circuit between it and the main conductor as the motor-car travels on the track, substantially as and for the purposes described.

5. An electrical switch consisting of a tubular arm $d$, bars $d'$, projecting from the ends of the tubular arm, and a spring $f$, bearing on said bars, in combination with a casing containing the switch, substantially as and for the purposes described.

6. In an electric-railway system having an insulated main conductor with branches and exposed contact plates or rails adapted to be temporarily connected with said main conductor by the passage of a car, the combination therewith of a surface-slot along the railway, and capstan-headed switches for making and breaking the required electrical contact, said switches being located underground and arranged with their capstan-heads in the slot, substantially as described.

In testimony whereof I have hereunto set my hand this 2d day of October, A. D. 1886.

WILLIAM J. McELROY.

Witnesses:
THOMAS W. BAKEWELL,
W. B. CORWIN.